Patented June 7, 1949

2,472,583

UNITED STATES PATENT OFFICE 2,472,583

PRODUCTION OF CYCLIC NITROGEN BASE SULFONATES

Felix C. Gzemski, Philadelphia, Pa., assignor to The Atlantic Refining Company, Philadelphia, Pa., a corporation of Pennsylvania No Drawing. Application November 7, 1944, Serial No. 562,408

7 Claims. (Cl. 260—239)

The present invention relates to the method of producing cyclic nitrogen base sulfonates, and more particularly to the preparation of pyridinium and quinolinium salts of oil-soluble sulfonic acids. Such compounds are of particular utility in the production of bituminous or asphaltic compositions of improved adhesivity for mineral aggregates, as described in my copending application Serial Number 562,407, filed November 7, 1944.

In accordance with this invention, the sulfonates are prepared by reacting oil-soluble sulfonic acids with a cyclic nitrogen base in an amount sufficient to at least partially neutralize the sulfonic acids, and preferably to completely neutralize the acids. The quantities of cyclic nitrogen base and sulfonic acids to be used may be determined by titrating the former with mineral acid in the presence of an indicator such as methyl orange, and by titrating the latter with a base such as potassium hydroxide in the presence of phenolphthalein indicator, and calculating from these data the equivalent amounts of the respective components. The oil-soluble sulfonic acids may be derived from petroleum oils, heavy coal tar distillates, fats, fatty oils, and the like by subjecting the raw material to treatment with a sulfonating agent such as concentrated sulfuric acid, fuming sulfuric acid, chlorsulfonic acid, or sulfur trioxide for a period of time sufficient to effect sulfonation, and thereafter separating insoluble sludge from the oil containing the sulfonic acids. The oil solution of sulfonic acids is then neutralized with the cyclic nitrogen base to form a relatively insoluble cyclic nitrogen base sulfonate which may be separated from the oil and thereafter treated, if desired, for the removal of entrained oil. The cyclic nitrogen bases which may be employed include pyridine, the alkyl substituted pyridines such as the methyl and ethyl pyridines (lutidines), quinoline, the alkyl substituted quinolines (quinaldines), isoquinoline, or mixtures of two or more thereof. In preparing the cyclic nitrogen base sulfonate, there is added to the oil containing the sulfonic acids an amount of nitrogen base calculated to give from 90% to 100% neutralization of the sulfonic acids, and the mixture is thoroughly agitated for a period of time sufficient to effect neutralization. This operation may be carried out at ordinary temperature, but in order to render the separation of the nitrogen base sulfonate from the oil more rapid, the temperature of the mixture is preferably increased to 180° F.–220° F., a temperature of about 200° F. being quite satisfactory. The temperature is maintained within this range until the sulfonate begins to precipitate and settle, and the temperature is then reduced to 140° F.–160° F. and the oil is decanted from the sulfonate at this temperature. If desired, the sulfonate may be centrifugally separated from the oil, provided the temperature is maintained sufficiently high to prevent solidification of the sulfonate. At temperatures between 140° F. and 220° F. the sulfonate, which normally occludes some oil, is a viscous material which will flow at such temperatures, but at ordinary temperatures (70° F.) the sulfonate is solid. While it is preferred to effect separation of the sulfonate from the oil at elevated temperature, it is, of course, possible to accomplish such result at ordinary temperatures, provided a sufficiently long settling period is employed. In the case of sulfonates prepared from relatively heavy oils, or high boiling naphthenic oils, the precipitation of the sulfonates and the settling thereof from the oil may be facilitated by the addition of a small amount of water, for example, from 1% to 3% by volume of the oil.

If desired, the oil normally entrained in or occluded by the sulfonate may be removed by treatment with a suitable solvent or solvent mixture. For example, the crude sulfonate may be dissolved or dispersed in heavy naphtha and extracted with alcohol, whereby the sulfonate is taken up by the alcohol and the oil remains in the naphtha. The naphtha solution is decanted from the alcohol solution, and the respective solvents may be recovered by distillation. The sulfonate is only partially soluble in oils which have been heavily acid treated, i. e., the oil after sulfonation for the production of the instant sulfonates, and is relatively insoluble in paraffinic hydrocarbons such as the liquefied normally gaseous hydrocarbons, pentane, and light naphtha, or paraffinic oils, such as selective solvent treated lubricating oils or raffinate fractions. However, the sulfonate is soluble in or at least compatible with bituminous materials such as petroleum asphalt or residua, flux asphalts, coal tar pitches or residua, cracking tars or residues, and aromatic or naphthenic hydrocarbons or oils such as benzene, toluene, and the higher homologues, as well as naphthenic extracts from the selective solvent treatment of lubricating oil stocks. The sulfonate is also soluble in carbon tetrachloride, ethyl alcohol, and acetone. The sulfonate may vary from a brown or black solid material to a stringy, greaselike material, depending upon the nature of the sulfonic acid and cyclic nitrogen base from which it is prepared.

The present invention may be further illustrated by the following examples, which, however, are not to be construed as limiting the scope thereof.

1. A selective solvent extract fraction of a lubricating oil stock having a Saybolt universal viscosity of 524 seconds at 100° F. and at A. P. I. gravity of 17.3° was treated with 5 successive dumps of 5% by volume each of 98% concentration sulfuric acid, the acid sludge being settled and separated between each dump. To 10 parts by weight of the sour oil containing about 14% of oil-soluble sulfonic acids was added 1 part by weight of quinoline, and the mixture was thoroughly agitated at about 80° F. until the neutralization reaction was completed. The mixture was then settled and a dark colored precipitate of quinolinium sulfonate was separated from the oil by decantation.

2. The same oil stock as employed in Example 1 was subjected to sulfonation as described in Example 1. The oil containing the sulfonic acids, after separation of insoluble acid sludge, had a neutralization number of 14.3 mg. KOH per gram. Samples of this sour oil were neutralized with a mixture of pyridines boiling between 284° F. and 392° F. having a neutralization number of 545, using various amounts of the pyridine mixture. The pyridine mixture was commingled with the oil containing the sulfonic acids and the mixture was vigorously agitated, then heated to about 200° F. for a short period of time, and thereafter cooled to 150° F., thereby permitting the relatively insoluble pyridinium sulfonate to settle from the oil in the form of stringy, viscous threads which accumulated in the settling vessel. After completion of the settling, the oil was decanted from the sulfonate, and the resulting sulfonate upon reaching room temperature had the consistency of a heavy grease. The results of the above process are shown in the following table.

| Grams Sour Oil | Grams High Boiling Pyridines | Grams of Pyridinium Sulfonate | Per Cent Yield Sulfonate | Neut. No. of Neutralized Oil |
|---|---|---|---|---|
| 244 | 6.6 | 51.6 | 20.7 | 1.76 |
| 246 | 4.7 | 35.0 | 13.6 | 6.14 |
| 247 | 2.8 | 4.7 | 1.9 | 13.72 |

While the present invention has been described primarily with reference to the production of cyclic nitrogen base sulfonates by reacting oil solutions of the sulfonic acids with the cyclic bases and precipitating the resulting relatively insoluble sulfonates, such invention may also be applied in the formation of sulfonates from oil-soluble sulfonic acids which have been isolated from oil in accordance with conventional procedures. However, the principal advantage of the present invention is the production of the sulfonates directly from the oil containing the sulfonic acids without resort to more lengthy and expensive procedures.

Furthermore, while the cyclic nitrogen base sufonates containing small amounts of entrained oil are suitable for many purposes, there may be occasions when the presence of entrained oil is undesirable. As pointed out hereinbefore, such oil may be removed by treatment with solvents such as heavy naphtha and alcohol. Another method of removing such oil comprises admixing the crude sulfonate with light naphtha, such as 88° naphtha, or with liquefied normally gaseous hydrocarbons such as ethane, ethylene, propane, propylene, the butanes, butenes, or the pentanes, or mixtures thereof, and raising the temperature sufficiently to permit thorough contacting with the solvent, the operation being carried out under sufficient pressure to maintain the solvent in the liquid phase. Temperatures of the order of 140° F. to 220° F. are suitable. The sulfonate, being relatively insoluble in the solvent, is then permitted to settle, and the solvent containing the oil dissolved from the sulfonate is decanted or otherwise removed. In this manner a substantial amount of the oil initially associated with the sulfonate may be readily removed.

I claim:

1. The method of producing a heterocyclic nitrogen base sulfonate, which comprises intimately commingling an oil solution of a sulfonic acid with a heterocyclic nitrogen base in an amount sufficient to at least partially neutralize the sulfonic acid, adding a small quantity of water to the mixture, settling the mixture, and separating the heterocyclic nitrogen base sulfonate from the oil.

2. The method of producing a heterocyclic nitrogen base sulfonate, which comprises intimately commingling an oil solution of a sulfonic acid with a heterocyclic nitrogen base in an amount sufficient to at least partially neutralize the sulfonic acid, heating the mixture to a temperature between 180° F. and 220° F., cooling the mixture to a temperature between 140° F. and 160 F., and separating the heterocyclic nitrogen base sulfonate from the oil at a temperature between 140° F. and 160° F.

3. The method of producing a heterocyclic nitrogen base sulfonate, which comprises intimately commingling an oil solution of a sulfonic acid with a heterocyclic nitrogen base in an amount sufficient to at least partially neutralize the sulfonic acid, heating the mixture to a temperature between 180° F. and 220° F., cooling the mixture to a temperature between 140° F. and 160° F., settling the mixture at a temperature between 140° F. and 160° F., and separating the heterocyclic nitrogen base sulfonate from the oil.

4. The method of producing a pyridinium sulfonate, which comprises intimately commingling an oil solution of a sulfonic acid with pyridine in an amount sufficient to at least partially neutralize the sulfonic acid, heating the mixture to a temperature between 180° F. and 220° F., cooling the mixture to a temperature between 140° F. and 160° F., and separating the pyridinium sulfonate from the oil at a temperature between 140° F. and 160° F.

5. The method of producing a quinolinium sulfonate, which comprises intimately commingling an oil solution of a sulfonic acid with quinoline in an amount sufficient to at least partially neutralize the sulfonic acid, heating the mixture to a temperature between 180° F. and 220° F., cooling the mixture to a temperature between 140° F. and 160° F., and separating the quinolinium sulfonate from the oil at a temperature between 140° F. and 160° F.

6. The method of producing a pyridinium sulfonate, which comprises intimately commingling an oil solution of a petroleum sulfonic acid with pyridine in an amount sufficient to at least partially neutralize the sulfonic acid, adding a small quantity of water to the mixture, settling the mixture, and separating the pyridinium sulfonate from the oil.

7. The method of producing a quinolinium sulfonate, which comprises intimately commingling an oil solution of a petroleum sulfonic acid with quinoline in an amount sufficient to at least partially neutralize the sulfonic acid, adding a small quantity of water to the mixture, settling the mixture, and separating the quinolinium sulfonate from the oil.

FELIX C. GZEMSKI.

REFERENCES CITED

The following references are of record in the file of this patent:

UNITED STATES PATENTS

| Number | Name | Date |
| --- | --- | --- |
| 1,780,144 | Reddish | Oct. 28, 1930 |
| 1,856,020 | Bertsch et al. | Apr. 26, 1932 |
| 2,061,601 | Steik | Nov. 24, 1936 |
| 2,104,728 | Bertsch et al. | Jan. 11, 1938 |
| 2,130,668 | Gunther | Sept. 20, 1938 |
| 2,204,326 | Steik | June 11, 1940 |
| 2,215,940 | Shonle | Sept. 24, 1940 |
| 2,236,515 | Cahn | Apr. 1, 1941 |
| 2,289,760 | Dickey | July 14, 1942 |